United States Patent [19]

Duffy

[11] Patent Number: 5,307,895
[45] Date of Patent: May 3, 1994

[54] HYDRAULIC REACTION VARIABLE ASSIST POWER STEERING CONTROL HYDRAULIC "DETENT"

[75] Inventor: James J. Duffy, Livonia, Mich.

[73] Assignee: Ford Motor Company, Dearborn, Mich.

[21] Appl. No.: 37,825

[22] Filed: Mar. 29, 1993

[51] Int. Cl.⁵ .................................. B62D 5/06
[52] U.S. Cl. .............................. 180/143; 180/132; 180/149
[58] Field of Search ............ 180/132, 149, 143, 141, 180/142

[56] References Cited

U.S. PATENT DOCUMENTS

| | | | |
|---|---|---|---|
| 3,877,540 | 4/1975 | Masuda et al. | 180/79.2 R |
| 4,434,866 | 3/1984 | Duffy | 180/143 |
| 4,561,521 | 12/1985 | Duffy | 180/142 |
| 4,570,735 | 2/1986 | Duffy | 180/142 |
| 4,570,736 | 2/1986 | Waldorf | 180/143 |
| 4,676,334 | 6/1987 | Nakamura et al. | 180/142 |
| 4,715,464 | 12/1987 | Nakamura et al. | 180/142 |
| 4,730,687 | 3/1988 | Chikuma et al. | 180/142 |
| 4,765,428 | 8/1988 | Kawakami et al. | 180/143 |
| 4,805,714 | 2/1989 | Nakamura et al. | 180/141 |
| 4,905,784 | 3/1990 | Yamashita | 180/143 |
| 4,913,250 | 4/1990 | Emori et al. | 180/79.1 |
| 5,016,723 | 5/1991 | Sano | 180/143 |
| 5,147,009 | 9/1992 | Chikuma et al. | 180/143 |

Primary Examiner—Richard M. Camby
Assistant Examiner—Kevin Hurley
Attorney, Agent, or Firm—Roger L. May; Raymond L. Coppiellie

[57] ABSTRACT

A power steering system for an automotive vehicle having a rotary steering valve comprising an inner valve member and a surrounding valve sleeve member, the valve members having cooperating valve lands that control pressure distribution to a fluid motor that effects a steering assist, the valve sleeve being connected mechanically to the fluid motor and a driver controlled steering shaft being connected to driven portions of the steering system, fluid pressure reaction pistons in the steering gear assembly providing a reaction force that opposes relative motion of the steering valve members, pressure regulator valve means and vehicle speed sensitive valve means for tailoring the reaction forces to provide an optimum steering assist at all vehicle speeds, and means for providing a detent force that produces a threshold value of steering torque before the onset of power assist.

9 Claims, 5 Drawing Sheets

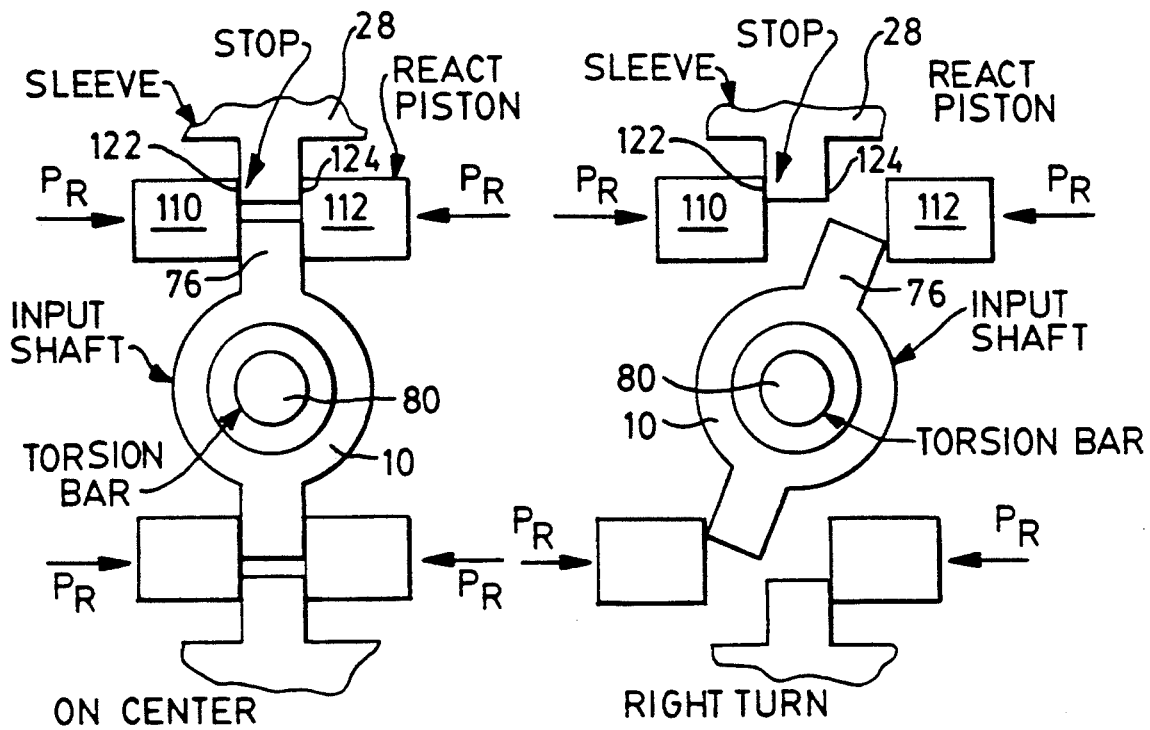
FIG-4 ON CENTER
FIG-5 RIGHT TURN
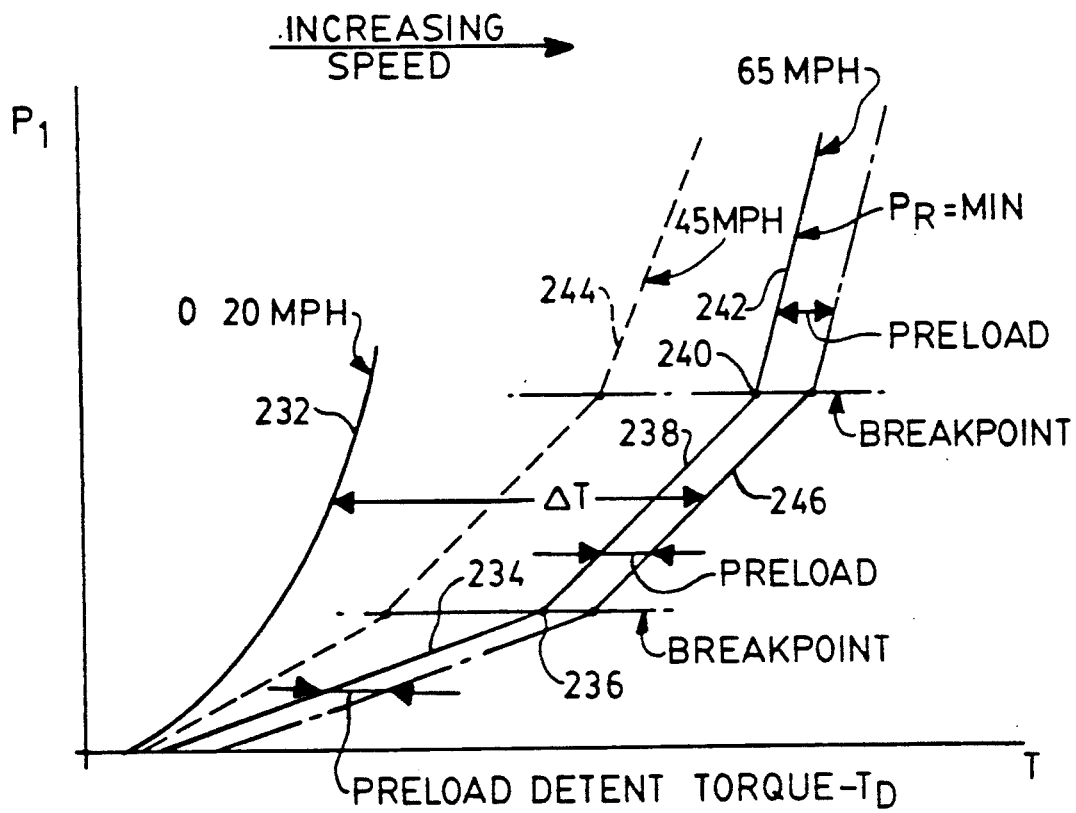
FIG-8

HYDRAULIC REACTION VARIABLE ASSIST POWER STEERING CONTROL HYDRAULIC "DETENT"

TECHNICAL FIELD

This invention relates to improvements in a power steering system for automotive vehicles wherein provision is made for changing the degree of power assist during high speed turning maneuvers and wherein a minimum threshold steering torque is required for straight ahead corrective steering.

BACKGROUND OF THE INVENTION

It is common practice in the power steering art to provide steering gear mechanisms with a power assist for controlling turning maneuvers of a vehicle. The power assist is achieved by a fluid pressure motor that responds to the rotary motion of a rotary steering valve that is actuated by the vehicle operator. Differing steering characteristics can be achieved depending upon the calibration of the rotary valve mechanism.

It is known practice also to provide a steering system wherein the degree of power assist can be changed depending upon the vehicle speed. It is desirable to provide a high degree of power assist during parking maneuvers of the vehicle and during steering maneuvers at low speeds, whereas the steering assist that is desirable for high speeds is relatively reduced.

The steering valve of such known designs may be a rotary valve mechanism in which a sleeve valve member is connected through a rack and pinion mechanism to steering gear linkages for the vehicle and an inner rotary valve member is connected to the steering shaft. The valve members are provided with registering valve lands. The steering shaft is connected to the rack and pinion mechanism by means of a torsion member which permits relative angular movement of one valve member with respect to the other thereby controlling pressure distribution to the fluid motor. Torque applied to the steering shaft in one direction will develop a pressure differential in the motor in one direction for a turning maneuver in one direction and the steering torque applied to the steering shaft in the opposite direction will achieve a pressure differential in the opposite direction.

The steering gear mechanism of such known designs is powered by a power steering pump driven by the vehicle engine. The pump comprises a flow control valve that achieves a constant flow regardless of pump speed. Relative angular adjustment of the valve members then will create a steering pressure depending upon the degree of relative movement, which in turn depends upon the steering torque applied to the steering shaft.

In my co-pending patent application Ser. No. 811,963, filed Dec. 23, 1991, entitled Electronic Power Assist Control, I have disclosed a steering system in which the relationship between steering torque and steering pressure within a low torque range is different than the corresponding relationship within a high torque range. Upon a given change in torque in a torque range greater than a so-called breakpoint value, the change in steering pressure is greater than the change in steering pressure that occurs for the same torque change in a torque range below the breakpoint.

The steering gear mechanism of my co-pending application includes reaction pistons which are subjected to steering pressure so that a reaction force opposes relative movement of the valve members, one with respect to the other. A modulator valve mechanism modifies the steering pressure applied to each reaction piston to establish one or more breakpoints in the relationship between steering pressure and torque.

BRIEF DESCRIPTION OF THE INVENTION

My invention is adapted to be used in a steering system of a kind disclosed in my co-pending application and in a steering system of the kind disclosed, for example, in U.S. Pat. No. 4,561,521. In the steering gear of my co-pending application, as well as in the steering gear of the '521 patent, the relationship between pressure and valve flow area can be expressed by the equation $$\text{PRESSURE} = \frac{K}{A^2}$$

where A is the effective flow area across the valve lands and K is a calibration constant. This relationship is true because the flow delivered by the pump is a constant regardless of varying pump speeds.

According to a principal feature of my invention, I have made provision for a detent torque to be superimposed on the valve characteristics so that a pressure assist will be absent until steering torque applied to the steering shaft reaches a threshold or detent value. If the steering torque is less than the so-called detent torque, a change in torque will not result in an increase in steering pressure. If the detent torque is exceeded, the relationship between the steering pressure and torque will be similar to the pressure and torque relationship described in my co-pending patent application. Thus, the steering pressure will increase upon increases in torque in the torque range between the detent torque value and the breakpoint torque value. Thereafter, the pressure will increase at an increased rate as torque increases occur in a higher torque range greater than the breakpoint. The characteristic functional relationship between pressure and torque, however, is modified by the preload detent torque in torque ranges both above and below the breakpoint.

The improvements of my invention provide a different steering sensation at low steering torque values. That is, my invention achieves a crisp, positive response of the steering system to steering torque applied to the steering shaft by the vehicle operator for steering corrections during straight ahead driving. As the vehicle operator initiates a turning maneuver, however, the detent force will be exceeded and the power assist will occur as increases in torque above the detent torque value result in an increase in steering pressure. That increase in steering pressure will be detectable by the vehicle operator because the increased steering pressure will result in increased reaction pressure.

This preload detent torque is added to the pressure/torque relationship throughout the entire range of steering torque values.

BRIEF DESCRIPTION OF THE FIGURES OF THE DRAWINGS

FIG. 4 is a schematic representation of the relationship between the reaction pistons and the valve sleeve of FIG. 1 during straight ahead driving;

FIG. 5 is a schematic representation of the relationship of the reaction pistons to the valve sleeve during a right turn maneuver;

FIG. 8 is a graph showing the effect of a preload that is achievable by either of the two disclosed embodiments.

BEST MODE FOR CARRYING OUT THE INVENTION

Figure 1:
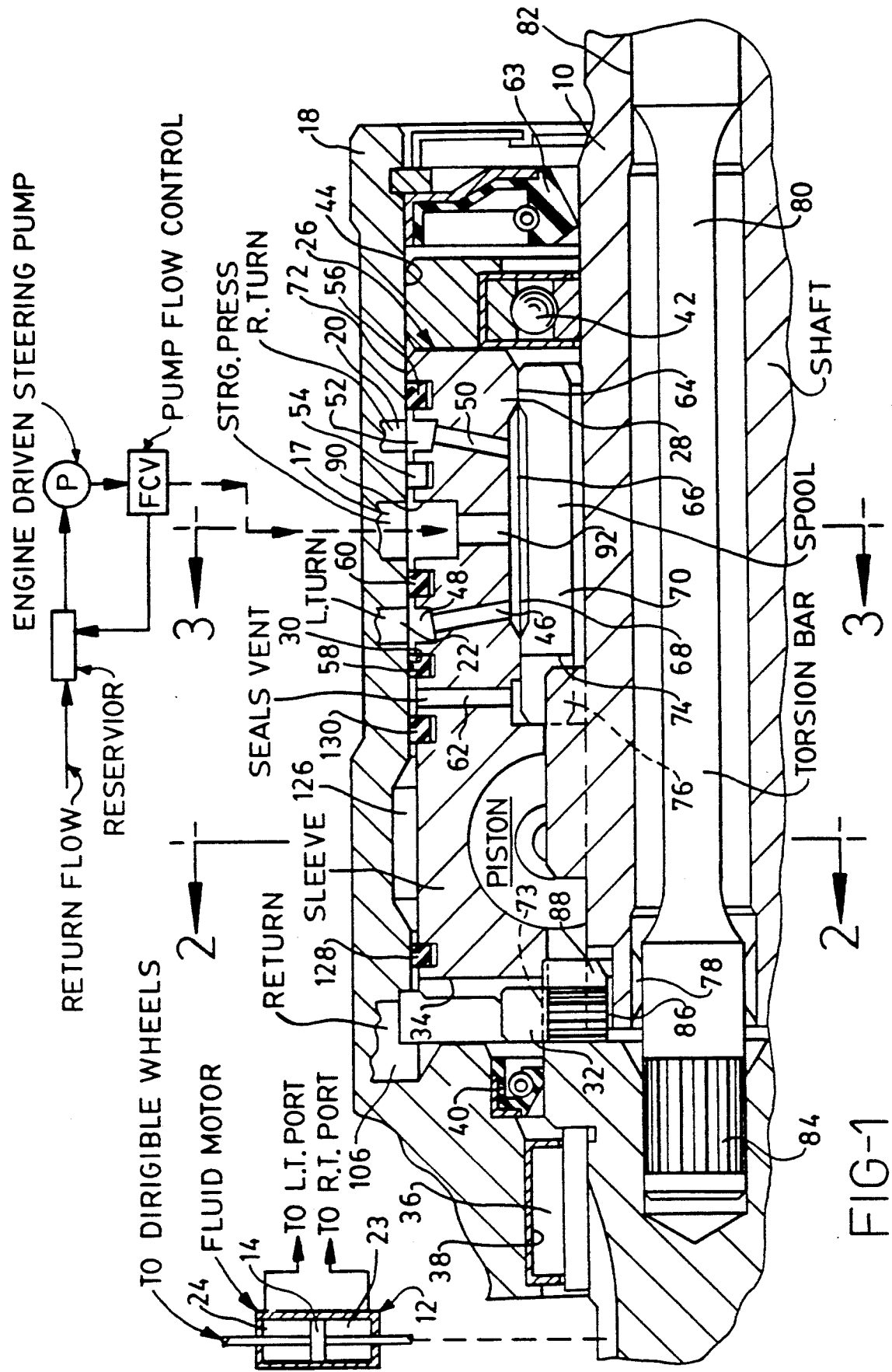
FIG. 1 is a cross-sectional view of a steering system including a rotary valve mechanism of the kind that is capable of embodying the improvements of my invention.

Numeral 10 in FIG. 1 designates a driver-controlled steering shaft for a motor vehicle. Numeral 12 generally designates, in schematic form, a fluid motor having a pressure-actuated piston 14 connected to the vehicle traction wheels through a suitable steering linkage (not shown). A pinion 16 is adapted to be connected by means of a rack-and-pinion assembly to the piston 14. Steering pressure from the engine driven power steering pump is delivered to steering pressure inlet port 17.

The steering gear includes a cylindrical housing 18 in which the port 17 is formed. The pump includes a flow control value that maintains a constant fluid delivery to port 17 regardless of pump speed. A right turn port 20 and a left-turn port 22 also are formed in the housing 18. These are connected, respectively, to pressure chambers 23 and 24 for the fluid motor 12.

FIG. 1 shows a steering valve assembly identified generally by reference numeral 26. This valve assembly comprises a valve sleeve 28 situated in a valve cylinder 30. A drive pin 32 formed in the pinion 16 extends radially with respect to the axis of the sleeve 28 and engages an end groove 34 in one end of the sleeve 28. Thus, during steering maneuvers, the sleeve 28 moves with the pinion 16 within the steering valve cylinder 30.

The pinion 16 is journalled by a bearing 36 in bearing opening 38 formed in the housing 18. A fluid seal 40 seals the pinion and the housing opening through which the pinion extends.

Steering shaft 10 is journalled by bearing 42 on the right-hand side of the sleeve 28 as shown in FIG. 1. Bearing 42 provides a bearing support as it is carried by the cylinder 30 of the housing 18 as shown at 44.

Left-turn passage 46 in the sleeve 28 communicates with annular groove 48, which in turn communicates with left-turn passage 22. Similarly, right-turn port 50 communicates with an annular groove 52 in sleeve 28. Groove 52 in turn communicates with right-turn port 20. Seal rings are disposed in seal ring grooves situated on either side of the groove 52 as shown at 54 and 56. Similarly, seal ring grooves receive seal rings on either side of the left-turn port 22, as shown at 58 and 60. A vent port 62 in the sleeve 28 communicates with a vent port 106 in the housing 18. This provides a venting of the interior of the valve cylinder 30 between the seal 40 and a corresponding lip seal 63.

The valve sleeve 28 has a central opening 64 in which is formed internal valve lands 66. These register with external valve lands 68 formed on a valve spool 70, the latter being piloted at each of its axial ends in the opening 64.

Valve sleeve 28 is piloted in the housing 18 as pilot surface 72 registers with the opening 44. The other end of the sleeve 28 is piloted at 73, as seen at the left-hand side of the sleeve 28 shown in FIG. 1.

The spool 70 is provided with an angularly spaced slot 74 which registers with radial projections 76 formed on the torque input shaft 10, the latter being piloted by bearing element 78 on the left end of the torsion bar 80.

Torque input shaft 10 is drivably connected to the torsion bar 80 at 82. The left end of the torsion bar 80 is splined, as shown at 84, to an internally splined opening in the end of the pinion 16.

The left end of the torque input shaft 10 is provided with dog coupling teeth in the form of angularly spaced slots 86, which register with corresponding internal coupling teeth 88 in the right end of the pinion 16, thus forming a lost motion connection between the shaft 10 and the pinion 16. The degree of relative motion established by the dog coupling will permit the torsion bar to transmit torque from the input shaft 10 to the pinion 16 up to a limit. When that limit is reached, torque is transferred directly from the shaft 10 to the pinion 16 through the dog coupling.

Any misalignment of the sleeve 28 with respect to the axis of the pinion 16 can be accommodated by reason of the articulation that is permitted by the end bearing supports at the right end of the sleeve as shown at 72 and the left end of the sleeve as shown at 73. Regardless of the angular disposition of the axis of the sleeve 28 with respect to the axis of the pinion 16, the spool 70 will precisely register with the sleeve 28 because of the articulated connection between the spool 70 and the input shaft 10 provided by the slot 74 and the projection 76. The spool thus can be considered to be a floating valve spool which always registers precisely with the internal valve lands of the sleeve 28 regardless of any slight misalignment of the sleeve with respect to the pinion 16.

Figure 3:
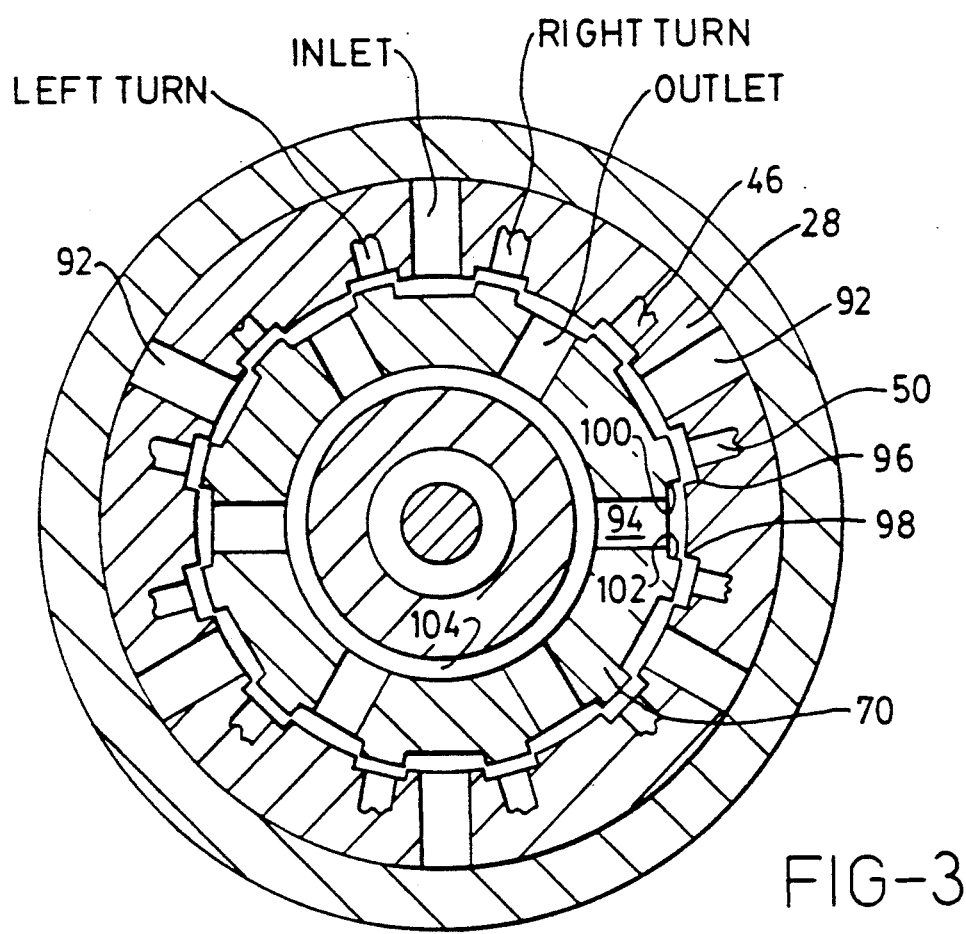
FIG. 3 is a cross-sectional view taken along the plane of section line 3—3 of FIG. 1.

As seen in FIG. 1, pressure input port 17 communicates with a groove 90 in the sleeve 28. This, in turn, communicates with radial ports 92. Valve spool 70 is provided with radial ports 94, as seen in FIG. 3, which are situated between internal valve lands 96 and 98 formed in the valve sleeve. External valve lands 100 and 102 formed in the spool 70 register, respectively, with internal lands 96 and 98, thus forming a flow passage on either side of radial ports 94.

The radially inward ends of ports 94 communicate with annular space 104, which is a flow return passage that communicates with return flow passage 106 seen in FIG. 1.

When the valve spool is centered with respect to the sleeve, the flow area established by the registering valve lands for the right-turn port 50 is substantially the same as the flow area for the left-turn port 46. Thus, the pressure differential across the steering motor piston 14 is zero and the pressure forces are balanced. Fluid flow delivered through the passage 92 is distributed in this case across the valve lands and through the radial ports 94 to the flow return passage.

If steering torque is applied in a right turn direction to the torsion bar, the valve spool will shift slightly in a clockwise direction relative to the valve sleeve seen in FIG. 3, thereby enlarging the flow area between passage 92 and port 50 and simultaneously decreasing the flow area between passage 92 and the port 46 leading to the right-turn side of the fluid motor. This provides a steering assist which complements the steering torque applied to the pinion through torsion bar 80.

If torque is delivered to the pinion 16 through the torsion bar 80 in the opposite direction, the flow area for the left-turn port is increased, and the flow area for the right-turn port is decreased, thus providing for a steering assist in the opposite direction.

It should be noted in FIG. 3 that in a left turn as the external lands controlling the flow increases the degree of communication between passage 92 and port 46, the corresponding degree of communication between port 50 and radial passage 94 is decreased. The converse is true when the direction of the steering torque is reversed. This change in flow area results in a pressure differential in accordance with the pressure function described in the "Brief Description of the Invention" set forth above.

According to a principal feature of my invention, I have provided a means for resisting the angular motion of the spool relative to the sleeve, and I have provided a means for varying the amount of that resistance depending upon the speed of the vehicle. This is achieved by the hydraulic reaction pistons shown in FIG. 2.

Figure 2:
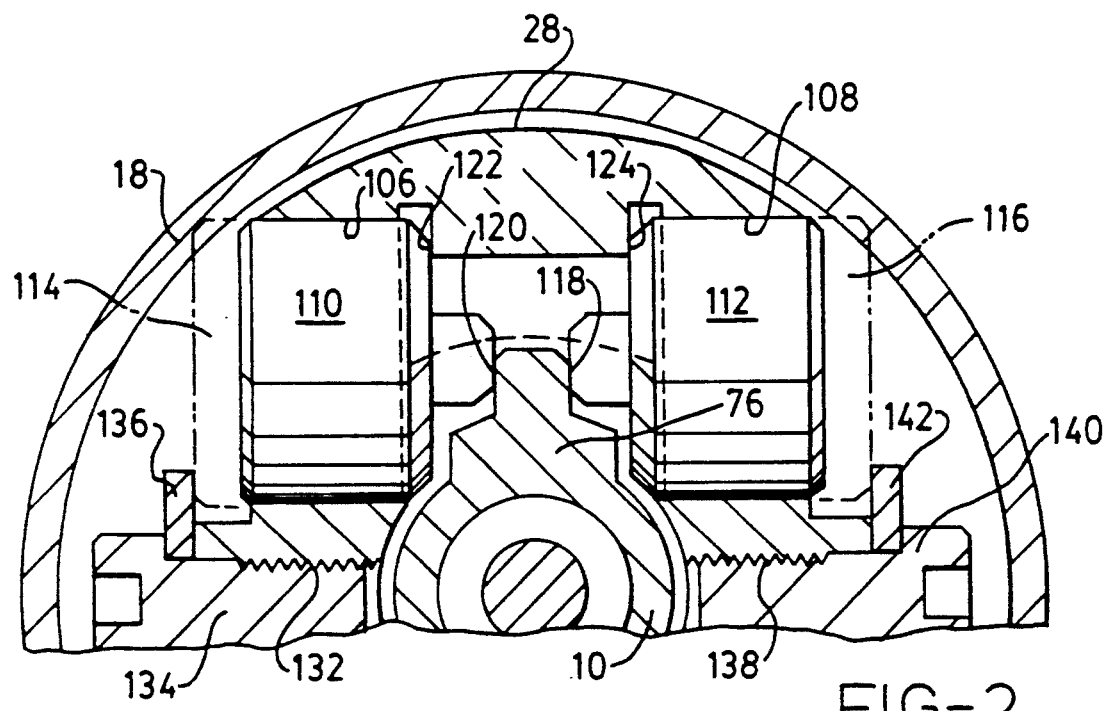
FIG. 2 is a cross-sectional view taken along the plane of section line 2—2 of FIG. 1.

As seen in FIG. 2, the sleeve is provided with a pair of opposed reaction pressure cylinders 106 and 108. A reaction piston 110 is slidably disposed in cylinder 106, and a corresponding piston 112 is slidably disposed in reaction cylinder 108. Piston 110 and cylinder 106 define a reaction pressure chamber 114 which communicates with a reaction pressure port (not shown) formed in the housing 18. Similarly, piston 112 and cylinder 108 define a reaction pressure chamber 116 which communicates with the same reaction pressure port formed in the housing 18.

Projection 76 on the steering shaft 10 includes a reaction surface 118 which is engaged by the piston 112 and a reaction surface 120 which is engaged by the piston 110. When the working chamber 116 is pressurized, a reaction pressure force developed on the piston 112 causes a counterclockwise torque to be applied to the shaft 10. Similarly, if the pressure chamber 114 is pressurized, piston 110 will apply a clockwise torque to the shaft 10 as viewed in FIG. 2.

When the shaft 10 is centered with respect to the sleeve, piston 110 engages a stop shoulder 122 formed in the sleeve 28, and piston 112 engages a stop shoulder 124 also formed in the sleeve 28. During straight-ahead driving, when the steering pressures on either side of the piston 14 of the fluid motor are balanced, the reaction pressures in chambers 114 and 116 are balanced and the pistons 110 and 112 assume the position shown in FIG. 2.

If the spool is displaced relative to the sleeve, one of the pistons 110 or 112 is displaced from its stop 106 or 124 and the pressure in the reaction pressure chamber 114 and 116 resists relative angular displacement of the shaft with respect to the sleeve.

It is apparent from the foregoing description that the magnitude of steering torque that is achieved is dependent in part upon the pressure established in the chambers 114 and 116. I have made provision for controlling that pressure differential so that the relationship between steering torque and steering pressure can be modified or tailored to suit any particular driving condition. For example, at high speeds, the resistance to angular displacement of the steering shaft relative to the sleeve is increased.

Figure 6:
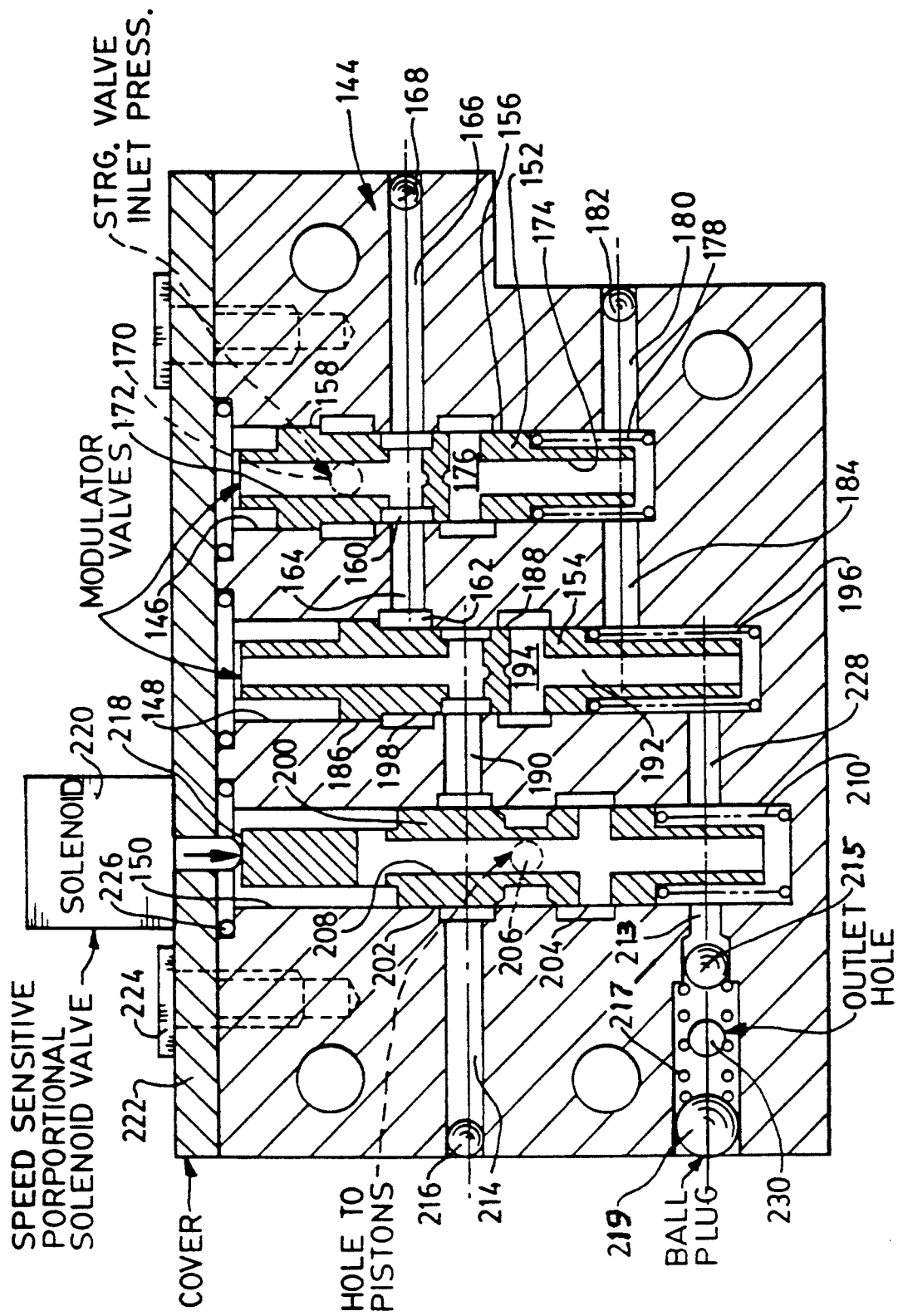
FIG. 6 is a view of a valve system for establishing breakpoints in the steering pressure and steering torque relationship and for providing changes in that relationship as the vehicle speed increases.

FIG. 6 shows a valve assembly for controlling the steering pressure in the steering gear mechanism of FIGS. 1-5. The valve assembly comprises a valve body 144 which is provided with three spool valve openings 146, 148 and 150. A first modulator valve spool 152 is received in valve opening 146 and a second modulator valve spool 154 is received in valve opening 148.

Valve spool 152 comprises a first valve land 156 and the second relatively large diameter valve land 158. An outlet valve port 160 for the first modulator valve communicates with a flow inlet port 162 for the second modulator valve. Ports 160 and 162 are in fluid communication through passage 164.

Passage 164 is formed in the valve body 144 by drilling an opening 166 from the right side of the valve body 144, as viewed in FIG. 6. After the opening 166 is formed, the right hand end of the opening is plugged with a ball plug 168.

A steering gear inlet pressure port 170 is formed in the valve body 144. It communicates with the chamber 146 at a location adjacent land 158. The port 170 is formed by drilling an opening in the valve body 144 in a direction transverse to the direction of opening 166. Port 170 communicates with a transverse opening in valve spool 152, which communicates with central passage 172. Pressure distributed to the inlet port 170 is transferred to the upper end of valve spool 152 through the passage 172. An outlet passage 174 also is centrally disposed within the valve spool 152. It communicates with transverse passage 176, which extends through the land 156. A valve spring 178 urges the valve spool 152 in an upward direction as viewed in FIG. 6.

Outlet pressure from the valve spool 152 communicates with low pressure outlet passage 180 formed in the valve body 144. Passage 180 is formed by drilling in a direction transverse to the axis of the opening 146. After the drilling operations, it is closed with a spherical plug 182.

Passage 180 is aligned with a crossover passage 184 between the spring chamber for the first modulator valve spool 152 and spring chamber 148 for the second modulator valve. The outlet pressure passage 164 for the first modulator valve functions as the inlet pressure passage for the second modulator valve.

Passage 164 communicates with chamber 148 adjacent valve land 186 on the valve spool 154. A second valve land 188 on the valve spool 154 controls the degree of communication between outlet passage 190 for the second modulator valve spool 154 and outlet pressure passage 192 formed in the valve spool 154. Passage 192 communicates with radial passage 194 which extends through the valve land 188. Passage 192 communicates with spring chamber for the valve spool 154. Valve spring 196 is located in the spring chamber for the valve spool 154.

Valve land 198 on valve spool 154 controls the degree of communication between passage 164 and outlet pressure passage 190. The pressure in passage 190 is distributed to the upper end of the valve spool 154 to create a pressure force that opposes the force of the spring 196.

The outlet pressure passage 190 forms an inlet pressure passage for a speed sensitive proportional solenoid valve, which comprises a multiple land valve spool 200 situated in valve chamber 150. Valve spool 200 comprises a first valve land 202 and a second valve land 204. Passage 190 communicates with the valve chamber 150 adjacent land 202. An outlet pressure port 206 formed in the valve body 144 extends in a direction perpendicular to the axis of the valve spool 200. Port 206 communicates with a radial passage in the valve spool 200, which communicates with internal passage 208 in the valve spool 200. Passage 208 extends to the upper end of the valve chamber 150 and creates a pressure force that opposes the force of valve spring 210 acting in an upward direction on the valve spool 200.

The degree of communication between the spring chamber for spring 210 and the outlet pressure passage 206 is controlled by land 204.

Crossover passage 190 forms a part of drilled passage 214 in the valve body 144. After the passage 214 is formed by drilling, it is plugged by a spherical plug 216.

In addition to the pressure force acting in a downward direction on valve spool 200 in opposition to the force of the spring 210, there is a solenoid force acting on the upper end 218 of the valve spool 200. The solenoid force is created by solenoid actuator 220 which is secured to a cover 222 bolted by bolts 224 to the valve body 144. Each of the two modulator valves and the speed sensitive proportional solenoid valve is sealed at its upper end by an O-ring, the O-ring for the speed sensitive proportional solenoid valve being shown at 226.

The spring chamber for spring 210 communicates with the spring chamber for spring 196 through crossover passage 228. That passage is formed as a continuation of the outlet of passage 213, which is drilled in the valve body 144. Passage 213 receives a ball valve element 215, which has a diameter approximately the same as the diameter of the outlet opening 213 although sufficient clearance is provided to permit floating movement of the ball valve element 215. Ball valve element 215 is urged toward the right direction, as seen in FIG. 6, by ball valve spring 217. Spring 217 is seated on ball plug 219, which is received with a force fit in the outboard end of the chamber for the spring 217.

The ball valve element acts as a needle valve as it floats in the valve chamber and is silent as it regulates outlet pressure.

The pressure in passage 213 and in the spring chambers for the springs 210, 196 and 178 acts as a detent pressure. That detent pressure will create a detent torque ($T_D$). Outlet hole 230 is an exhaust pressure outlet. Outlet port 206 communicates with the reaction chambers 114 and 116 to create a detent torque.

Shown in FIG. 8 is the relationship between pressure and torque. Curve 232 represents the steering pressure that is developed by the rotary steering valve mechanism at low speeds; for example, at speeds between 0 and 20 miles per hour. Curve 234 is a curve representing the steering pressure as reaction pressure acts, upon an increase in speed, on the pistons. Initially, both modulator valves are fully opened. When the force of the first modulator valve spring is overcome, a breakpoint 236 is created in the 65 mph curve and the slope of the steering pressure and torque relationship changes as shown at 238. As the spring force of the second modulator valve is overcome, a second breakpoint 240 is created, again changing the slope to a steeper value as shown at 242.

As mentioned earlier, the output of the first modulator valve serves as the input for the second modulator valve. The output for the second modulator valve serves as the input to the speed sensitive proportional solenoid valve. As the speed increases, the force of the solenoid decreases, thereby allowing the effective upward force on the valve spool 200 to increase. This has the effect of shifting the characteristics curves of FIG. 8 in a right hand direction. Conversely, a decrease in speed will cause a shifting of the curves of FIG. 8 in a left hand direction. The characteristic curve during an intermediate speed (for example, 45 miles per hour) is indicated in FIG. 8 at 244. As in the case of the high speed curve, designated in FIG. 8 as the 65 mile per hour curve, the 45 mile per hour curve has two breakpoints corresponding to the breakpoints 236 and 240. These breakpoints occur, respectively, as the first and second modulator valves begin to modulate the steering valve pressure to produce a modified reaction piston pressure.

In FIG. 8, I have shown the effect of the detent torque, which represents a preload. The 65 mile per hour curve will be shifted in a right hand direction to the position indicated by reference numeral 246. As a result of the preload, a similar shift to the right will occur for the characteristic curves at each of the other speed values indicated in FIG. 8 as well as for speed values intermediate those illustrated in FIG. 8.

The value for steering torque equals:

$$T = R\phi + \frac{\pi}{4} D^2 P_p L$$

where R = spring rate of the torsion bar
$\phi$ = angular displacement of the torsion bar
D = reaction piston diameter
$P_p$ = reaction piston pressure
L = distance between reaction piston centers.

If $\phi$ equals 0 and the reaction pressure on the pistons equals the detent value of 20 psi, for example, then T equals detent torque.

The value $\Delta T$ shown in FIG. 8 can be expressed as:

$$\Delta T = P_p \times \frac{\pi}{4} D^2 \times L$$

Figure 7:
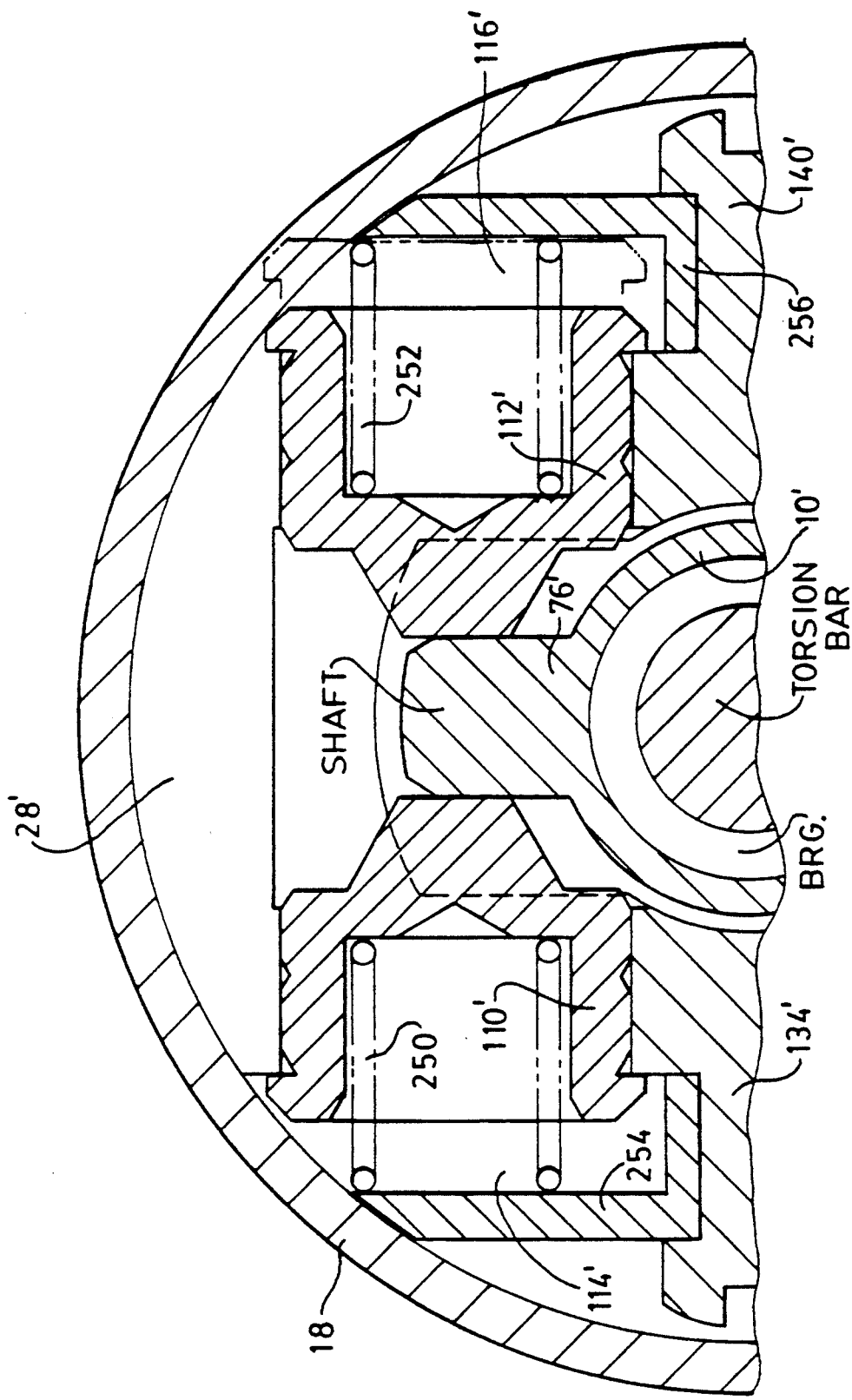
FIG. 7 is a modified valve assembly that includes a spring detent feature as distinct from a hydraulic detent feature of the embodiment of FIGS. 1 through 6.

FIG. 7 is an alternate embodiment of the invention. This embodiment provides a mechanical spring detent force rather than a hydraulic detent pressure force. In the case of FIG. 7, the reaction pistons are biased by reaction piston springs, which opposes the relative motion of the valve sleeve 28' with respect to the steering shaft.

In the embodiment of FIG. 7, the elements that have counterpart elements in the embodiment of FIG. 2 have been indicated by similar reference characters, although prime notations are added in FIG. 7. The mode of operation of the reaction pistons and the steering valve elements is the same in the embodiment of FIG. 7 as in the case of the previously described embodiment.

The pistons 110' and 112' are movably mounted in the valve sleeve 28', which opposes the motion of the inner and outer valve members. Reaction cylinder 110 is urged in a right hand direction by valve spring 250 and reaction piston 112' is urged in a left hand direction, as viewed in FIG. 7, by reaction spring 252. Springs 250 and 252 establish a preload or detent torque. The function of that detent torque is the same as the function of the hydraulic reaction pressure detent torque described previously.

Spring 250 in FIG. 7 is seated on a reaction element 254 held axially fast by the clamping bolt 134' at a location between the housing 18 and the reaction piston 110'. Similarly, spring 252 acting on the reaction piston 112' is seated on a spring seat member 256 secured in place by the clamping bolt 140' at a location between housing 18 and reaction piston 112'.

Either the hydraulic detent embodiment or the mechanical spring load detent embodiment will provide an initial detent feel for corrective steering during straight ahead driving when the steering torques are lower than the detent torque. Steering pressures will begin to increase in accordance with the relationships illustrated in FIG. 8 only after the detent torque has been exceeded.

Having described preferred embodiments of my invention, what I claim and desire to secure by U.S. Letters Patent is:

1. A fluid pressure operated power steering gear mechanism for a vehicle comprising:
   a fluid pressure source, a steering pressure movable part adapted to be connected to a steering linkage for a vehicle, a drive member connected to said pressure movable part, a driving shaft subjected to steering torque connected to said drive member;
   a valve housing, a rotary steering valve means situated in said housing and partly defining pressure distribution and flow return passages extending between said pressure source and said pressure movable part for establishing steering pressure and steering pressure differential forces on said pressure movable part;
   said steering valve means comprising an internal valve member and a surrounding sleeve valve member, said internal valve member and said sleeve valve member having registering valve lands, one of said valve members being connected to said driving shaft and the other being drivably connected to said drive member whereby relative rotary displacement of said valve members effects a change in the flow area through said steering valve means and a corresponding pressure differential change acting on said pressure movable part;
   at least two pressure reaction pistons in said sleeve valve member, passage structure in said steering valve means for distributing steering pressure from said steering valve means to said pressure movable part and to said reaction pistons thereby establishing opposed steering torque reaction forces;
   means for applying said reaction forces to one of said valve members whereby relative angular displacement of said valve members is resisted;
   modulator valve means communicating with said passage structure for modifying said steering pressure to provide a change in reaction pressure and an increased rate of increase in steering pressure for a given steering torque change, and detent means for establishing a detent torque that resists relative angular displacement of said valve members as steering torque is applied to said driving shaft.

2. The combination as set forth in claim 1 wherein said detent means includes a pressure limit valve communicating with said modulator valve means, said modulator valve means having a low pressure port, said pressure limit valve being in fluid communication with said low pressure port whereby a minimum low pressure detent force on said modulator valve means is established.

3. The combination as set forth in claim 1 wherein said detent means comprises a spring means for establishing a spring preload on said valve members that resists relative angular displacement of said valve members.

4. A fluid pressure operated power steering gear mechanism for a vehicle comprising:
   a fluid pressure source, a steering pressure movable part adapted to be connected to a steering linkage for a vehicle, a drive member connected to said pressure movable part, a driving shaft, a torsion rod connecting said driving shaft to said drive member;
   a rotary steering valve means situated in and partly defining pressure distribution and flow return passages extending between said pressure source and said pressure movable part to establish steering pressure and steering pressure differential forces on said pressure movable part;
   said steering valve means comprising an internal valve member and a surrounding sleeve valve member, said internal valve member and said sleeve valve member having registering valve lands, one of said valve members being connected to said driving shaft and the other being drivably connected to said drive member whereby deflection of said torsion rod effects changes in the flow area through said steering valve means and a corresponding pressure differential change acting on said pressure movable part;
   at least two pressure reaction pistons in said sleeve, passage structure in said steering valve means for distributing steering pressure from said steering valve means to said pressure movable part and to said reaction pistons thereby establishing opposed steering reaction forces;
   means for applying said reaction forces to one of said valve members whereby relative angular displacement of said valve members is resisted;
   at least one modulator valve means communicating with said passage structure for modulating said steering pressure to produce a modified pressure on said reaction pistons thereby providing an increased rate of increase in steering pressure for a given steering torque change, and detent means for establishing a detent torque that resists relative angular displacement of said valve members as said steering torque is applied to said driving shaft.

5. The combination as set forth in claim 4 wherein said detent means includes a pressure limit valve communicating with said modulator valve means, said modulator valve means having a low pressure port, said pressure limit valve being in fluid communication with said low pressure port whereby a minimum low pressure detent force on said modulator valve means is established.

6. The combination as set forth in claim 4 wherein said detent means comprises a spring means for establishing a spring preload on said valve members that resists relative angular displacement of said valve members.

7. A fluid pressure operated power steering gear mechanism for a vehicle comprising:
   a fluid pressure source, a steering pressure movable part adapted to be connected to a steering linkage for a vehicle, a drive member connected to said pressure movable part, a driving shaft subjected to steering torque connected to said drive member;

a valve housing, a rotary steering valve means situated in said housing and partly defining pressure distribution and flow return passages extending between said pressure source and said pressure movable part for establishing steering pressure and steering pressure differential forces on said pressure movable part;

said steering valve means comprising an internal valve member and a surrounding sleeve valve member, said internal valve member and said sleeve valve member having registering valve lands, one of said valve members being connected to said driving shaft and the other being drivably connected to said drive member whereby relative rotary displacement of said valve members effects a change in the flow area through said steering valve means and a corresponding pressure differential change acting on said pressure movable part;

at least two pressure reaction pistons in said sleeve valve member, passage structure in said valve means for distributing steering pressure from said steering valve means to said pressure movable part and to said reaction pistons thereby establishing opposed steering torque reaction forces;

means for applying said reaction forces to one of said valve members whereby relative angular displacement of said valve members is resisted;

modulator valve means communicating with said passage structure for modifying said steering pressure to provide a change in reaction pressure and an increased rate of increase in steering pressure for a given steering torque change, detect means for establishing a detent torque that resists relative angular displacement of said valve members as steering torque is applied to said driving shaft; and vehicle speed sensitive proportional valve means in fluid communication with said modulator valve means for increasing the rate of increase in steering pressure for a given increase in steering torque applied to said driving shaft as vehicle speed increases.

8. The combination as set forth in claim 7 wherein said detent means includes a pressure limit valve communicating with said modulator valve means, said modulator valve means having a low pressure port, said pressure limit valve being in fluid communication with said low pressure port whereby a minimum low pressure detent force on said modulator valve means is established.

9. The combination as set forth in claim 7 wherein said detent means includes means for establishing a force on said reaction pistons that opposes relative angular motion of said valve members whereby a threshold detent torque precedes the onset of steering assist as steering torque applied to said driving shaft increases.

* * * * *